(12) United States Patent
    Blanco et al.

(10) Patent No.: US 11,171,383 B1
(45) Date of Patent: Nov. 9, 2021

(54) BATTERY MODULE

(71) Applicant: Google LLC, Mountain View, CA (US)

(72) Inventors: Richard Lidio Blanco, Santa Clara, CA (US); Philippe H. Gow, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/150,798

(22) Filed: Oct. 3, 2018

Related U.S. Application Data

(62) Division of application No. 14/447,281, filed on Jul. 30, 2014, now Pat. No. 10,121,997.

(51) Int. Cl.
| | |
|---|---|
| *H01M 50/30* | (2021.01) |
| *H01M 50/20* | (2021.01) |
| *H01M 10/42* | (2006.01) |
| *H01M 10/6563* | (2014.01) |
| *H01M 10/0525* | (2010.01) |
| *H01M 50/392* | (2021.01) |

(52) U.S. Cl.
CPC ....... *H01M 50/30* (2021.01); *H01M 10/0525* (2013.01); *H01M 10/4257* (2013.01); *H01M 10/6563* (2015.04); *H01M 50/20* (2021.01); *H01M 50/392* (2021.01); *H01M 2220/20* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 1,672,042 A | * | 6/1928 | Schmidt | A62C 4/00 220/88.2 |
| 4,466,878 A | * | 8/1984 | DiNitto | G01N 27/404 204/415 |
| 6,447,946 B1 | * | 9/2002 | Nakai | H01M 4/131 29/623.5 |
| 6,720,101 B1 | * | 4/2004 | Dong | H01M 8/2475 429/435 |
| 7,976,972 B2 | * | 7/2011 | Arisaka | H01M 8/04223 429/48 |

(Continued)

FOREIGN PATENT DOCUMENTS

| | | | |
|---|---|---|---|
| CN | 103259065 | 8/2013 | |
| EP | 2579385 | 4/2013 | |
| JP | 2001-319697 | * 11/2001 | ............ H01M 10/50 |

*Primary Examiner* — Jonathan Crepeau
*Assistant Examiner* — Angela J Martin
(74) *Attorney, Agent, or Firm* — Fish & Richardson P.C.

(57) ABSTRACT

A battery module includes a housing that defines an inner volume and includes an airflow path from an aperture formed in a first end member of the housing, through the inner volume, to an aperture formed in a second end member of the housing; power cells mounted in the inner volume of the housing, where each of the power cells includes a vent member; and a barrier that at least partially interrupts a fluid pathway that extends between the vent members and at least one of the aperture formed in the first end member or the aperture formed in the second end member of the housing. The power cells are directionally mounted in the volume such that the vent members face an offset direction relative to at least one of the aperture formed in the first end member or the aperture formed in the second end member of the housing.

27 Claims, 7 Drawing Sheets

(56) References Cited

U.S. PATENT DOCUMENTS

| | | | |
|---|---|---|---|
| 8,158,294 B2* | 4/2012 | Takeguchi | H01M 8/0267 |
| | | | 429/432 |
| 8,399,119 B2 | 3/2013 | Koetting et al. | |
| 8,435,676 B2 | 5/2013 | Zhamu et al. | |
| 8,574,740 B2 | 11/2013 | Quick et al. | |
| 8,703,328 B2 | 4/2014 | Villarreal | |
| 8,728,682 B2* | 5/2014 | Kusakabe | H01M 8/248 |
| | | | 429/511 |
| 8,999,538 B2* | 4/2015 | Fuhr | H01M 2/08 |
| | | | 429/159 |
| 9,596,787 B1* | 3/2017 | Iyengar | H05K 7/20318 |
| 10,693,173 B2* | 6/2020 | Kakuwa | H01M 8/0273 |
| 2002/0034682 A1* | 3/2002 | Moores, Jr. | H01M 10/46 |
| | | | 429/120 |
| 2005/0130033 A1 | 6/2005 | Iwamura | |
| 2007/0031728 A1* | 2/2007 | Lee | H01M 2/1061 |
| | | | 429/120 |
| 2007/0196728 A1 | 8/2007 | Yang | |
| 2007/0259263 A1* | 11/2007 | Shibuya | H01M 2/105 |
| | | | 429/186 |
| 2008/0124623 A1 | 5/2008 | Hisamitsu et al. | |
| 2008/0280192 A1* | 11/2008 | Drozdz | H01M 10/6571 |
| | | | 429/62 |
| 2008/0318117 A1* | 12/2008 | Gross | H01M 50/24 |
| | | | 429/82 |
| 2009/0197153 A1* | 8/2009 | Fujikawa | H01M 2/1055 |
| | | | 429/82 |
| 2012/0164508 A1* | 6/2012 | Houchin-Miller | |
| | | | H01M 10/613 |
| | | | 429/120 |
| 2013/0040172 A1 | 2/2013 | Chen et al. | |
| 2013/0273399 A1 | 10/2013 | Oury et al. | |
| 2013/0302653 A1* | 11/2013 | Pham | H02J 7/00 |
| | | | 429/50 |
| 2014/0044999 A1 | 2/2014 | Albertus et al. | |

* cited by examiner

BATTERY MODULE

CROSS-REFERENCE TO RELATED APPLICATION

This application is a divisional of, and claims priority under 35 U.S.C. §§ 120 and 121 to, U.S. patent application Ser. No. 14/447,281, filed on Jul. 30, 2014, the entire contents of which are incorporated by reference herein.

TECHNICAL FIELD

This disclosure relates to a battery module and, more particularly, to a battery module for one or more power cells that includes a package that manages power cell failures.

BACKGROUND

Power cells, such as lithium-ion cells, are popular types of rechargeable cells, being characterized by high energy densities, no memory effect and slow loss of charge while being in idle state. Due to their advantages, lithium-ion cells are common not only in consumer electronics, but also in military, electric vehicle, aerospace and data center applications. The performance of lithium-ion cells is dependent on both the temperature and the operating voltage. One concern of lithium-ion cells is the existence of a number of failure mechanisms that can trigger a catastrophic failure. The failure of lithium-ion cells can involve the discharge of corrosive and flammable electrolyte as well as the discharge of a small amount of molten aluminum through a vent member of the lithium-ion cells that can affect the equipment in which they are installed. Moreover, the failure of one lithium-ion cell can propagate to nearby lithium-ion cells, increasing the risk of damaging the equipment in which they are installed. For example, burning electrolyte and active cell materials may spread from cell to cell, thereby propagating a fire throughout a battery module, and from one battery module to other battery modules

SUMMARY

In a general implementation, a battery module includes a housing that defines an inner volume and includes an airflow path from an aperture formed in a first end member of the housing, through the inner volume, and to an aperture formed in a second end member of the housing; a plurality of power cells mounted in the inner volume of the housing, where each of the power cells includes a vent member at an end of the power cell; and a barrier that at least partially interrupts a fluid pathway that extends between the vent members and at least one of the aperture formed in the first end member or the aperture formed in the second end member of the housing. The plurality of power cells are directionally mounted in the inner volume such that the vent members face an offset direction relative to at least one of the aperture formed in the first end member or the aperture formed in the second end member of the housing.

In a first aspect combinable with the general implementation, the barrier includes a baffle mounted in the inner volume near one of the first or second end members of the housing.

In a second aspect combinable with any of the previous aspects, the baffle includes one or more gaps through which the fluid pathway extends.

A third aspect combinable with any of the previous aspects further includes an air gap of between 2-3 mm between adjacent power cells.

A fourth aspect combinable with any of the previous aspects further includes a fluid absorbent material mounted in at least a portion of the inner volume.

In a second aspect combinable with any of the previous aspects, the fluid absorbent material is configured to absorb a liquid electrolyte discharged from one or more vent members.

A fifth aspect combinable with any of the previous aspects further includes an electrical connection electrically coupled to the plurality of power cells and exposed to an exterior of the housing; and a power cell management system mounted in the housing.

In a sixth aspect combinable with any of the previous aspects, the plurality of power cells include a plurality of lithium-ion batteries.

In a seventh aspect combinable with any of the previous aspects, each of the lithium-ion batteries includes a form factor 18650 lithium-ion battery.

In an eighth aspect combinable with any of the previous aspects, the offset direction is orthogonal relative to the airflow path.

A ninth aspect combinable with any of the previous aspects further includes a fan mounted in the aperture formed in the first end member.

A tenth aspect combinable with any of the previous aspects further includes an air gap between an inner surface of the housing and each of the plurality of power cells.

An eleventh aspect combinable with any of the previous aspects further includes a thermal insulation material mounted in at least a portion of the air gap.

A twelfth aspect combinable with any of the previous aspects further includes a frame mounted in the inner volume.

In a thirteenth aspect combinable with any of the previous aspects, the frame is configured to support each of the plurality of power cells and define at least a portion of the air gap.

In a fourteenth aspect combinable with any of the previous aspects, each of the plurality of power cells includes a substantially cylindrical shape defined by a diameter of a body of the power cell and a length of the body, and each of the power cells is mounted in the inner volume such that an axis that the length of each body is orthogonal to the airflow path.

A fifteenth aspect combinable with any of the previous aspects further includes an air chamber enclosed in the housing and fluidly decoupled from the airflow path.

In a sixteenth aspect combinable with any of the previous aspects, the air chamber is defined between the first and second end members of the housing such that at least one of the vent members is in fluid communication with the air chamber.

In another general implementation, a battery module includes a housing that defines an inner volume and includes an airflow path from an aperture formed in a first end member of the housing, through the inner volume, and to an aperture formed in a second end member of the housing; a plurality of power cells mounted in the inner volume of the housing, where each of the power cells includes a vent member at an end of the power cell; and an air chamber enclosed in the housing and fluidly decoupled from the airflow path, the air chamber defined between the first and second end members of the housing such that at least one of the vent members is in fluid communication with the air chamber. The plurality of power cells are directionally mounted in the inner volume such that the vent members face an offset direction relative to at least one of the aperture formed in the first end member or the aperture formed in the second end member of the housing.

In a first aspect combinable with the general implementation, the air chamber includes a first air chamber.

A second aspect combinable with any of the previous aspects further includes a second air chamber enclosed in the housing and fluidly decoupled from the airflow path.

In a third aspect combinable with any of the previous aspects, the second air chamber is defined between the first and second end members of the housing such that at least one of the vent members is in fluid communication with the second air chamber.

In a fourth aspect combinable with any of the previous aspects, the first and second air chambers are positioned on opposed sides of the housing.

A fifth aspect combinable with any of the previous aspects further includes at least one vent in the housing to fluidly couple the air chamber with an ambient environment.

In a sixth aspect combinable with any of the previous aspects, the vent in the housing is fluidly decoupled from the airflow path by one or more walls mounted in the inner volume.

In a seventh aspect combinable with any of the previous aspects, the air chamber is defined at least in part by the one or more walls and the housing.

In an eighth aspect combinable with any of the previous aspects, the airflow path includes a first airflow path.

A ninth aspect combinable with any of the previous aspects further includes a second airflow path that extends from the aperture formed in the first end member, through the air chamber, and to the aperture formed in the second end member.

In a tenth aspect combinable with any of the previous aspects, the first and second airflow pathways are fluidly decoupled in at least a portion of the inner volume.

An eleventh aspect combinable with any of the previous aspects further includes an air gap of between 2-3 mm between adjacent power cells.

A twelfth aspect combinable with any of the previous aspects further includes including a fluid absorbent material mounted in at least a portion of the inner volume.

In a thirteenth aspect combinable with any of the previous aspects, the fluid absorbent material is configured to absorb a liquid electrolyte discharged from one or more vent members.

In a fourteenth aspect combinable with any of the previous aspects, at least a portion of the fluid absorbent material is mounted in the air chamber.

A fifteenth aspect combinable with any of the previous aspects further includes an electrical connection electrically coupled to the plurality of power cells and exposed to an exterior of the housing; and a power cell management system mounted in the housing.

In a sixteenth aspect combinable with any of the previous aspects, the plurality of power cells include a plurality of lithium-ion batteries.

In a seventeenth aspect combinable with any of the previous aspects, wherein each of the lithium-ion batteries includes a form factor 18650 lithium-ion battery.

In an eighteenth aspect combinable with any of the previous aspects, the offset direction is orthogonal relative to the airflow path.

A nineteenth aspect combinable with any of the previous aspects further includes a fan mounted in the aperture formed in the first end member.

A twentieth aspect combinable with any of the previous aspects further includes an air gap between an inner surface of the housing and each of the plurality of power cells.

A twenty-first aspect combinable with any of the previous aspects further includes a thermal insulation material mounted in at least a portion of the air gap.

A twenty-second aspect combinable with any of the previous aspects further includes a frame mounted in the inner volume, the frame configured to support each of the plurality of power cells and define at least a portion of the air gap.

In a twenty-third aspect combinable with any of the previous aspects, each of the plurality of power cells includes a substantially cylindrical shape defined by a diameter of a body of the power cell and a length of the body.

In a twenty-fourth aspect combinable with any of the previous aspects, each of the power cells is mounted in the inner such that an axis that the length of each body is orthogonal to the airflow path.

A twenty-fifth aspect combinable with any of the previous aspects further includes a barrier that at least partially interrupts a fluid pathway that extends between the vent members and at least one of the aperture formed in the first end member or the aperture formed in the second end member of the housing.

In a twenty-sixth aspect combinable with any of the previous aspects, the barrier includes a baffle mounted in the inner volume near one of the first or second end members of the housing.

In a twenty-seventh aspect combinable with any of the previous aspects, the baffle includes one or more gaps through which the fluid pathway extends.

In another general implementation, a method of managing a vented solution from one or more cells of a battery module includes positioning a battery module. The battery module includes a housing that defines an inner volume, the housing including an aperture formed in a first end member of the housing and an aperture formed in a second end member of the housing; a plurality of power cells mounted in the inner volume of the housing, each of the power cells including a vent member at an end of the power cell, the plurality of power cells directionally mounted in the inner volume such that the vent members face an offset direction relative to at least one of the aperture formed in the first end member or the aperture formed in the second end member of the housing; and a barrier mounted in the inner volume. The method further includes circulating an airflow through the inner volume to cool the plurality of power cells; and based on a solution vented into the inner volume from at least one vent member, at least partially interrupting, with the barrier, a flow of the vented solution through a fluid pathway that extends between the vent members and at least one of the aperture formed in the first end member or the aperture formed in the second end member of the housing.

In another general implementation, a method of managing a vented solution from one or more cells of a battery module includes positioning a battery module. The battery module includes a housing that defines an inner volume, the housing including an aperture formed in a first end member of the housing and an aperture formed in a second end member of the housing; a plurality of power cells mounted in the inner volume of the housing, each of the power cells including a vent member at an end of the power cell, the plurality of power cells directionally mounted in the inner volume such that the vent members face an offset direction relative to at least one of the aperture formed in the first end member or the aperture formed in the second end member of the housing; and an air chamber enclosed in the housing. The method further includes circulating an airflow through an airflow path in the inner volume to cool the plurality of power cells; and based on a solution vented from at least one vent member, at least partially capturing the vented fluid in the air chamber that is fluidly decoupled from the airflow path.

Various implementations of a battery module according to the present disclosure may include one or more of the following features. For example, the battery module can be designed for safety venting by including air chambers to collect any electrolyte discharge and to control the pressure that could be generated by a power cell failure. The electrolyte discharge can be contained by an absorbent material placed at the base of the air chambers. The battery module can also include separate openings within the containment chambers to ambient air to prevent pressure buildup if safety venting occurs, by directing such venting away from electronics and maintenance locations where personnel may be present. The battery module can also be designed to enable a particular arrangement of the power cells that can prevent or diminish the effects of a power cell failure. The power cells are oriented within the battery module to direct the electrolyte discharge away from chassis openings in the event of a failure. The lowest row of power cells is elevated from the bottom of the battery module to enable the mitigation of the temperature of the power cells, in the event of an external fire. Thus, a risk of module-to-module fire propagation may be reduced, as well was a conduction of heat from burning power cells to a module case or housing. Moreover, a risk of a thermal event propagation may be reduced.

These general and specific aspects may be implemented using a device, system, method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

Figure 1A:
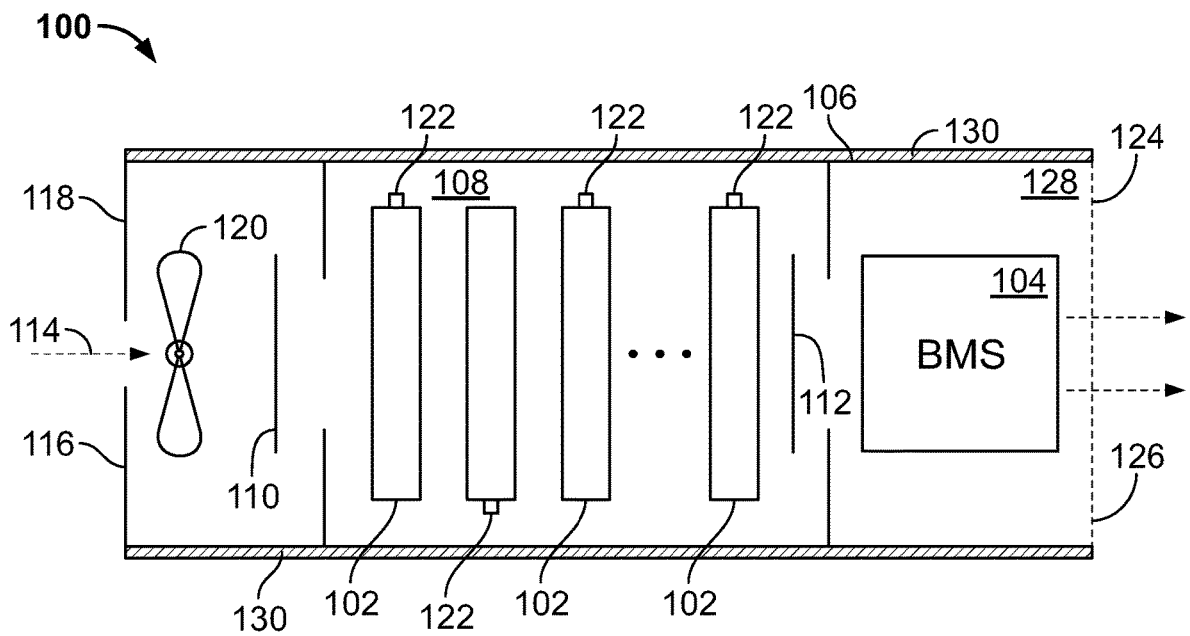
FIGS. 1A-1D illustrate schematic top, side, front and end views of an example battery module.

FIG. 1A shows a schematic top view of a battery module 100. In general, the battery module 100 includes and encloses a plurality of power cells 102 and a battery management system (BMS) 104 in a controlled environment. The battery module 100 includes infrastructure equipment, described in more detail below, that maintains the power cells 102 and BMS 104 at ambient conditions suitable for operation. For example, the battery module 100 includes cooling equipment and power supply equipment, such as an electrical connection electrically coupled to the plurality of power cells 102 and exposed to an exterior of the housing 106. The battery module 100 also includes features that prevent or minimize the amount of electrolyte discharged outside of the inner volume 108 in the event of failure of a power cell 102. In some examples, the battery module 100 can be a $LiFePO_4$ battery pack, a $LiCoO_2$ battery pack, a LiMnNi battery pack, a LiNiMnCo battery pack, or other suitable battery pack for inclusion in various types of equipment, such as data centers, electric vehicles, and hybrid vehicles. In some examples, each power cell 102 of a suitable battery pack can be a form factor 18650 lithium-ion battery.

The battery module 100 includes a housing 106 that defines an inner volume 108, a plurality of power cells 102 mounted in the inner volume 108 of the housing 106 and barriers 110 and 112. The housing 106 can be formed of non-inflammable materials, such as metal alloys having a high melting point. The barriers 110 and 112 can prevent a fluid leaking from a power cell 102 from flowing out of the inner volume 108. In some implementations, the barriers 110 and 112 define a baffle mounted in the inner volume 108 near one of the end members of the housing 106. The baffle can include one or more gaps through which the fluid pathway extends.

Figure 1B:
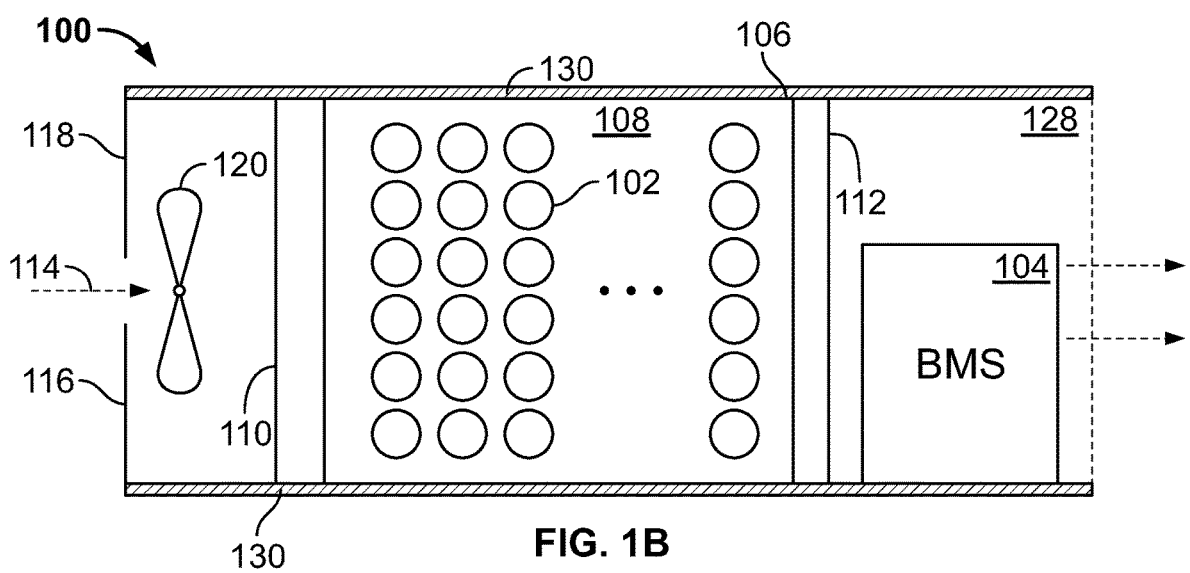
Figure 1C:
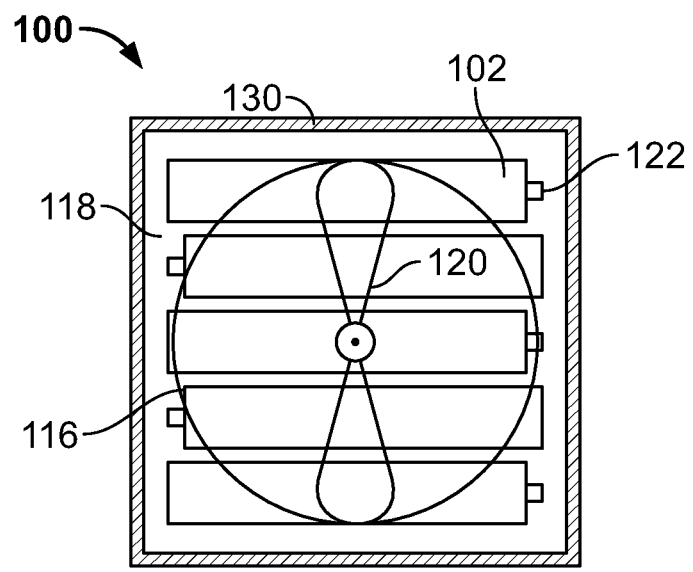

The housing 106 that defines the inner volume 108 also includes an airflow path. The housing 106 receives an outside airflow 114, through an aperture 116 formed in a first end member 118 of the housing 106. The outside airflow 114 is processed by a fan 120, which generates supply airflow (e.g., a cooling airflow) for the inner volume 108, as illustrated in FIGS. 1A-1C.

The fan 120 can circulate the generated airflow through the barrier 110 to the inner volume 108. The airflow is circulated around power cells 102 within the inner volume 108. Each power cell 102 has a substantially cylindrical shape defined by a diameter of a body of the power cell 102 and a length of the body.

Each power cell 102 includes a vent member 122 at an end of the power cell 102. The vent member 122 can enable thermal energy dissipation. For example, the vent member 122 may allow for a single release of high internal pressures, which may arise from an internal short circuit of the power cell 102 or from excessive heating of the cell 102. The vent member 122 may also indirectly aid in thermal dissipation, for instance, as a secondary function.

The power cells 102 are directionally mounted in the inner volume 108 such that the vent members 122 face an offset direction relative to at least one of the apertures 116 formed in the first end member 118 or the aperture 124 formed in the second end member 126 of the housing 106. In some implementations, the vent members 122 are oriented oppositely in every other row (or column) so that, for multiple venting accidents, the liquid is distributed more evenly within the volume 108 (e.g., and does not pool). This opposite orientation may also facilitate ease of electrical interconnection between the power cells 102. The axis of each body of the power cells 102 can also be substantially orthogonal to the airflow path defined between the fan 120 and the second end member 126. The combination of the orientation of the power cells 102 (vents orthogonal to apertures) and the barrier 112 may create a circuitous path for a leaking fluid between the vents and the apertures 124, decreasing the risk of a fluid escaping the housing 106 or reaching BMS 104.

As the airflow is circulated between the power cells 102, heat is transferred from the power cells 102 to the airflow. In some implementations, as illustrated in FIG. 1B, the power cells 102 can be arranged in a particular configuration that forms spacing between cell bodies. For example a distance of approximately 2-3 mm between adjacent power cells 102 can enable heat transfer from power cells 102 to the air to substantially reduce adjacent cell heating. In some implementations, an amount of heat generated by the power cells 102 and transferred to the airflow may be related to, for example, a temperature of the airflow relative to a temperature of the devices, a flow rate of the airflow, and a density of the power cells 102.

Figure 1D:
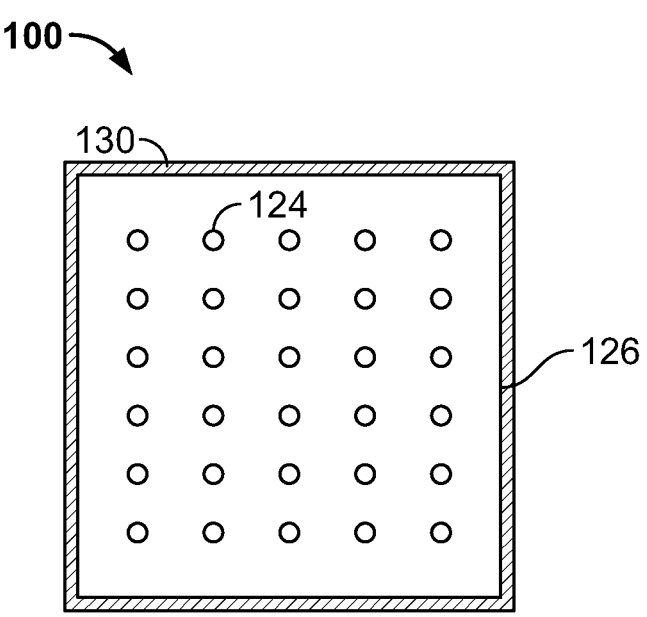

The airflow can exit the inner volume 108 around the barrier 112 to regulate the temperature in an auxiliary volume 128 that includes BMS 106. BMS 106 is an electronic system that manages the power cells 102, such as by protecting the power cells 102 from operating in critical conditions. BMS 106 can monitor the state of the power cells 102, calculating secondary data, reporting that data, controlling the environment, authenticating data and balancing data. For example, BMS 106 can control the environment of the battery module 100 by monitoring the temperature of the air exhausted from the inner volume 108. The air can exit the auxiliary volume 128 through the apertures 124 formed in the second end member 126 of the housing 106, as illustrated in FIG. 1D. In some implementations, the second end member 126 is also designed as a barrier, such that the apertures 124 have a geometry and arrangement that enable the exit of the air flow but prevent a damage of an external environment in case a power cell 102 fails.

The battery module 100 can further include an air gap between an inner surface of the housing 106 and each of the plurality of power cells 102, in which a thermal insulation material 130 is mounted. For example, the thermal insulation material 130 can be added to a side, top or bottom of the housing 106 to insulate the housing 106 in the event of an internal or external failure to significantly reduce heat transfer in and out of the battery to, for instance, prevent event propagation and/or limit heat flow into the housing 106 from an adjacent housing 106. In some implementations, the thermal insulation material 130 can be a ceramic medium layer, such as an aluminum-oxide ceramic that has a higher heat conductance coefficient than the molding compound of the housing 106. The thermal insulation material 130 can also be characterized by high thermal shock resisting performance to maintain the integrity of the battery module 100, after a failure of a power cell 102 that can induce an abrupt raise in temperature.

Figure 2A:
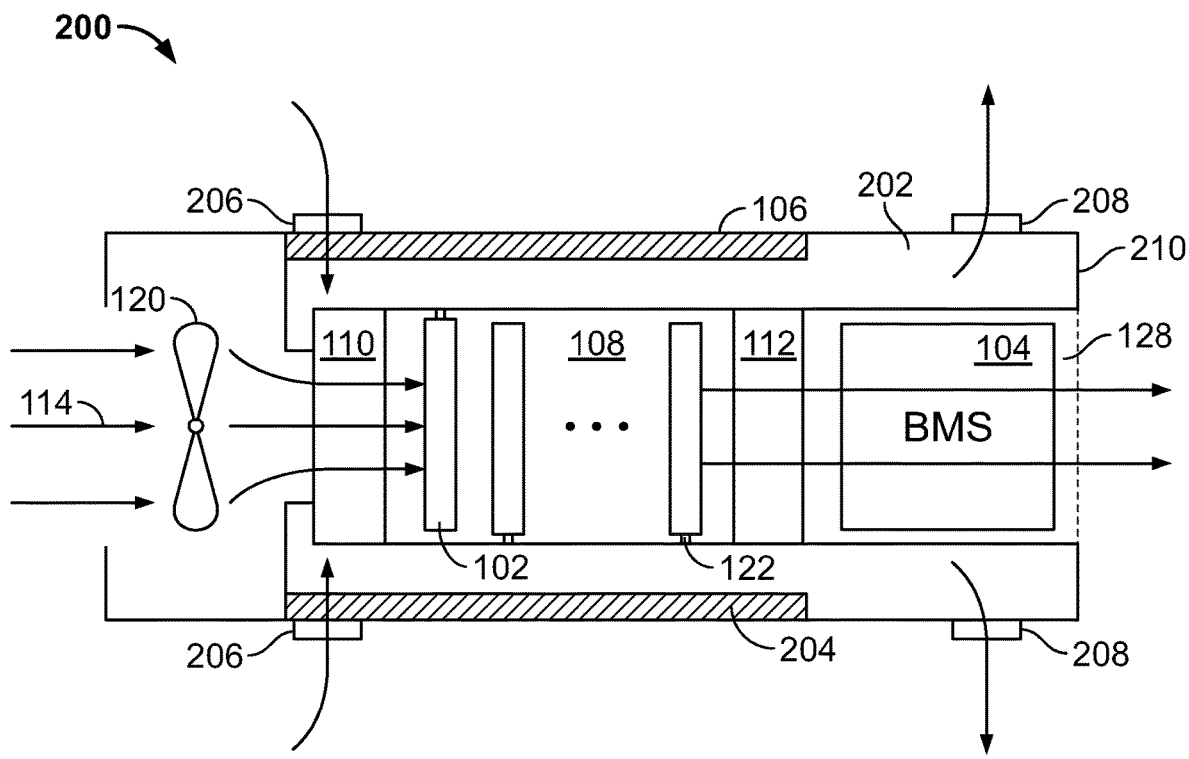
FIGS. 2A-2B illustrate schematic top and end views of another example battery module.
Figure 2B:
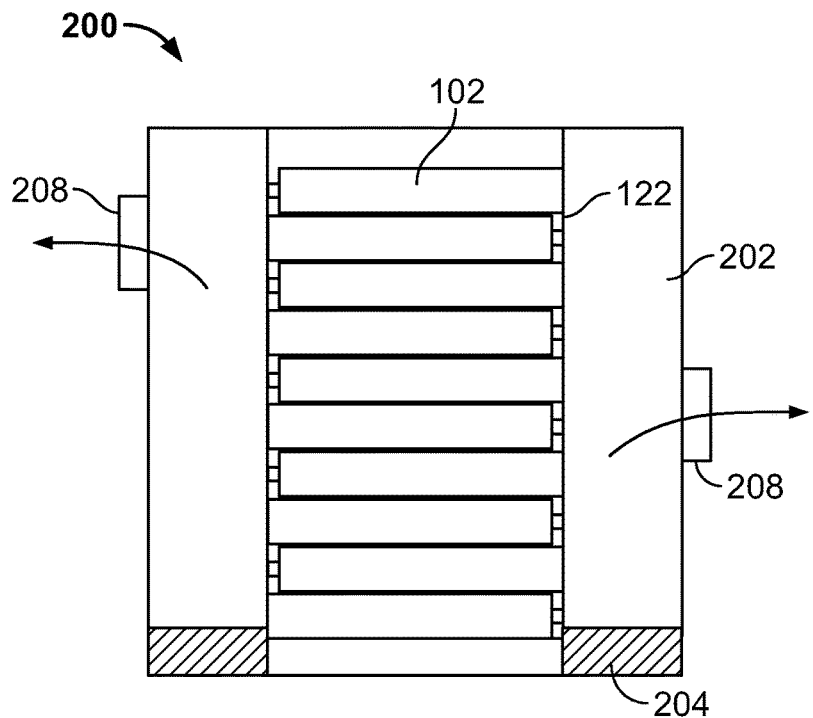

FIGS. 2A-2B illustrate another example battery module 200. Generally, battery module 200 may be an example configuration in which packaging characteristics are included to contain a liquid electrolyte discharged from one or more vent members that can occur in case one or more power cells 102 fail. For example, the inner volume 108 and the auxiliary volume 128 can include an air chamber 202 that extends from a location near or over the end of the safety vents of the power cells 102 to a side wall of the battery module 200. The air chamber 202, in this example, is fluidly decoupled from the airflow path within the inner volume 108. The air chamber 202 can contain and capture the electrolyte discharge, such that the arrangement of the power cells 102 can be associated to the location of the air chamber 202. For example, the power cells 102 can be arranged in a pack with safety vents 122 located by alternating opposing sides. Within the context example, an air chamber 202 is located proximal to each end of the cells, which means that the battery module 200 includes two air chambers.

In some implementations, each air chamber 202 can include an absorbent material 204. The absorbent material 204 can be located at the base of air the chamber 202 to capture any liquid electrolyte discharge that might flow from any power cell that is in contact with the air the chamber 202. The absorbent material 204 can be a suitable material which has the property of readily absorbing and retaining a large amount of the liquid electrolyte, such as polymers that can absorb and retain liquid electrolyte equivalent to many times their own weight. The absorbent material 204 may comprise, for example, peat which may be ground or otherwise broken up to form a substantially uniform texture. The peat may be uniformly mixed with a small proportion of other suitably absorbent materials, as for example, red cedar sawdust, poly olefins, layered polypropylene, and other absorbent materials.

The air chambers 202 can include separate openings 206 and 208 to ambient air to prevent pressure buildup if safety venting occurs. The openings 206 can be configured to enable ambient air to flow into the air chambers 202. The openings 208 can be configured to enable air from the chambers 202 to flow into the ambient air. For example, the openings 206 and 208 can include directional pressure valves that can open at a predetermined pressure or temperature of the air chamber 202. In some implementations, a single opening 206 or 208 is included on each air chamber 202. The single opening can enable air to flow in both directions between the air chamber 202 and the ambient environment, equalizing pressure between the air chamber 202 and ambient environment outside of the battery module 200.

The position of the openings 206 can be selected based on possible access to a substantial amount of ambient air at a predetermined temperature, which is preferably lower or equal to the average room temperature near the battery module 200. The position of the openings 208 can be selected based on a plurality of safety and environmental factors, such as the location of other electronic equipment and personnel access. As illustrated in FIG. 2B, the position of the openings 208 can be selected at different heights to direct venting away from electronics and maintenance locations where personnel can be present. The openings 208 can also be mounted on the end wall 210 of the air chamber 202.

Figure 3A:
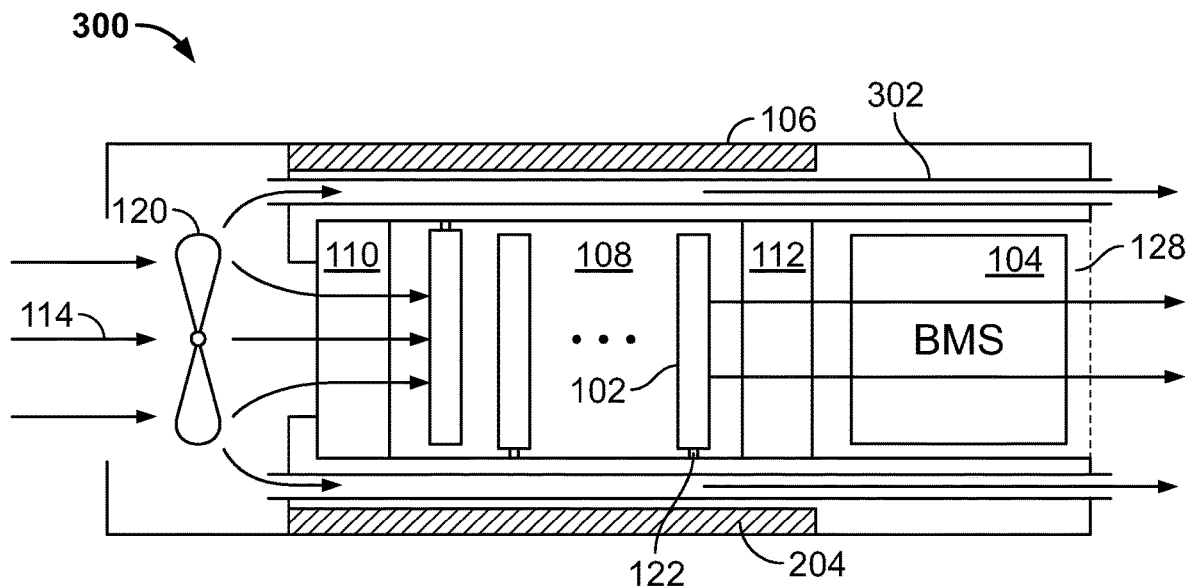
FIGS. 3A-3B illustrate schematic top and end views of another example battery module.
Figure 3B:
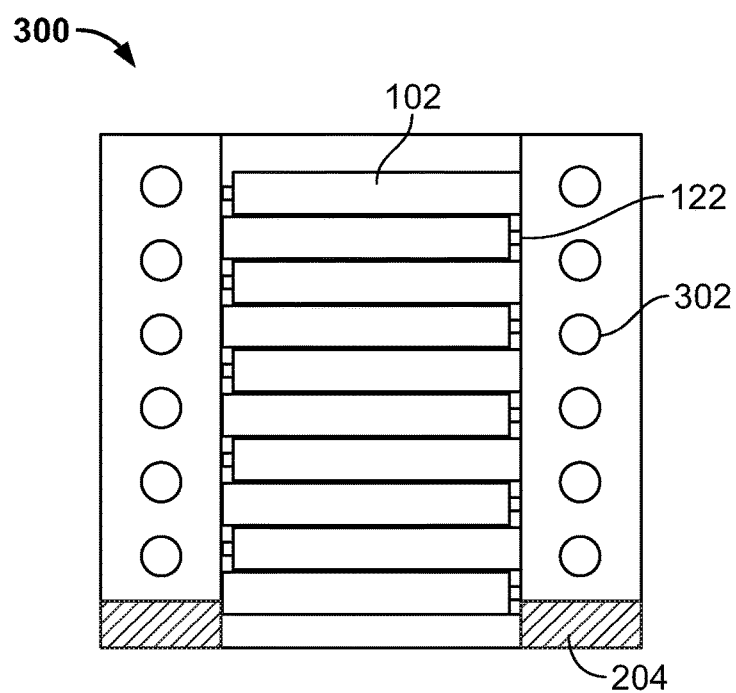

FIGS. 3A-3B illustrate another example battery module 300. Generally, battery module 300 may be an example configuration in which packaging characteristics are included to enhance the safety of the battery module 300. For example, the air chambers 202 can include an airflow path 302 that allows air from the fan to be circulated through the air chambers 202. In some implementations, the air chambers 202 can also include a cooling system, formed of one or more pipes made of high thermal conduction materials. The plurality of pipes forming the cooling system can be vertically aligned. The cooling system can extend from a location proximal to the fan 120 to the back wall 126 of the battery module 200. The cooling system can receive cool air directed by the fan 120 and it can exhaust air that was warmed up in the air chamber 202 in the ambient environment.

Figure 4A:
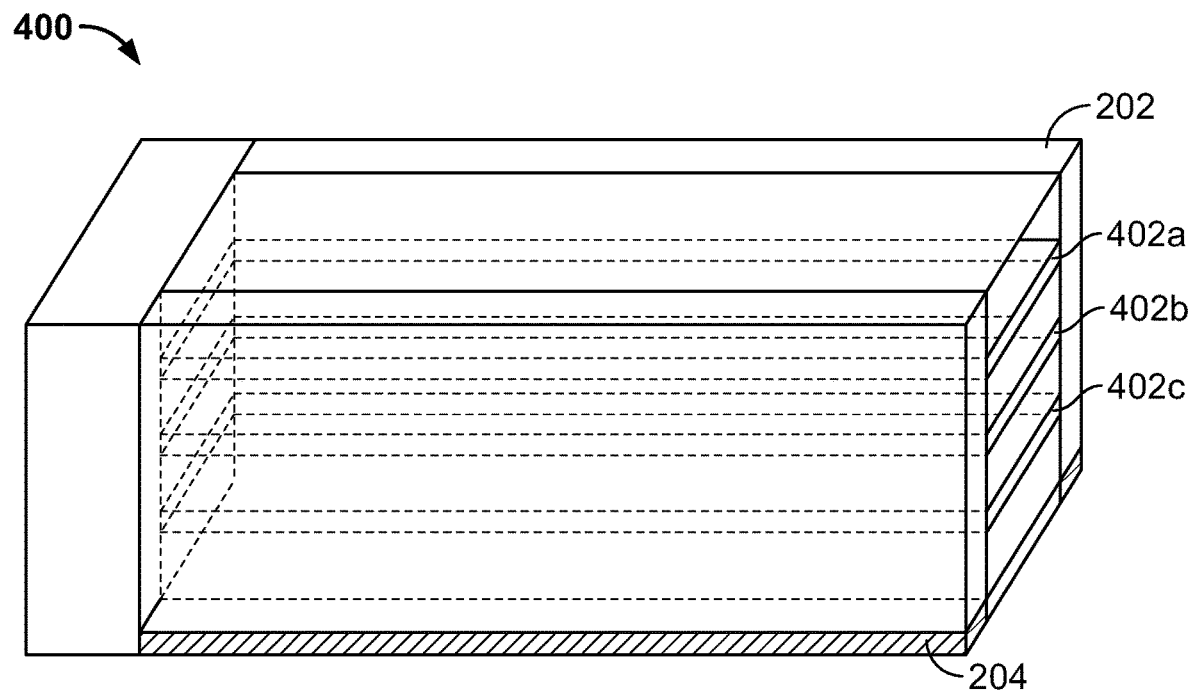
FIGS. 4A-4B illustrate schematic isometric and end views of another example battery module.
Figure 4B:
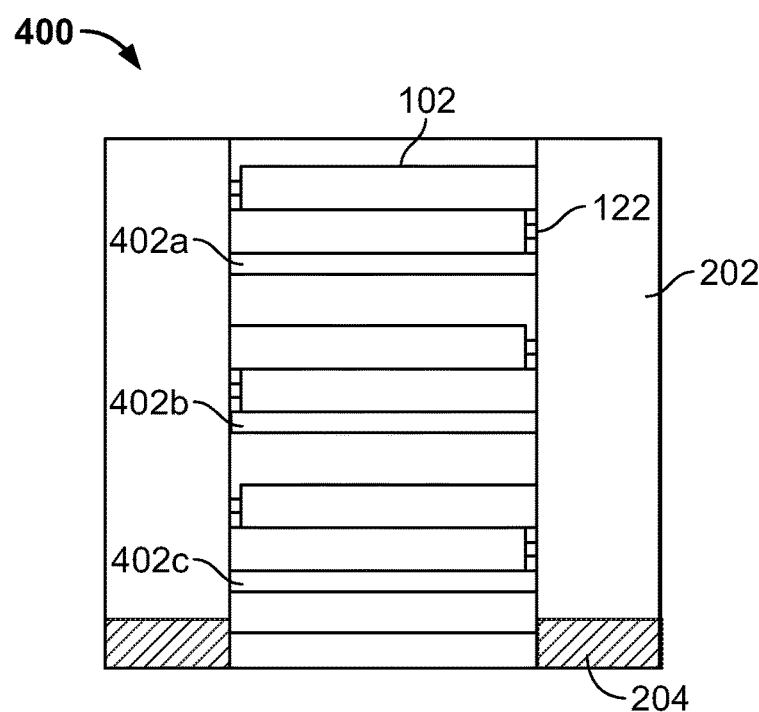

FIGS. 4A-4B illustrate another example battery module 400. Generally, battery module 400 may be an example configuration in which additional packaging characteristics are included to enhance the safety of the battery module 400 to prevent failure of power cells 102. For example, the battery module 400 can include a shelving system 402 for supporting the power cells 102. The shelving system 402 may also include one or more adjustable shelves 402a, 402b, and 402c that extend longitudinally across the inner volume 108. In some implementations, the shelving system 402 can be a self-supporting structure or it can be supported by the vertical walls of the battery module 400. The shelving system 402 may be manufactured from any material of appropriate strength, temperature resistance and corrosion resistance including, for example, stainless steel or painted ferrous steel, galvanized or plated metal, or titanium.

The distance between shelves and the number of power cells 102 arranged on each shelf 402a, 402b or 402c can be selected to optimize the airflow within the inner volume 108 and to prevent event propagation from one shelf to another, in case of power cell failure. For example, a plurality of power cells 102 can be arranged on each shelf 402a, 402b or 402c, such that the number of power cells that are in direct contact with other power cells is limited to a predetermined number. Using the shelving system 402, none of the power cells 102 is placed in direct contact with the bottom of the battery module 400. The placement of the lowest row of power cells 102 away from the bottom of the battery module 400 can enable the mitigation of the temperature of the power cells 102, in the event of an external fire.

Figure 5A:
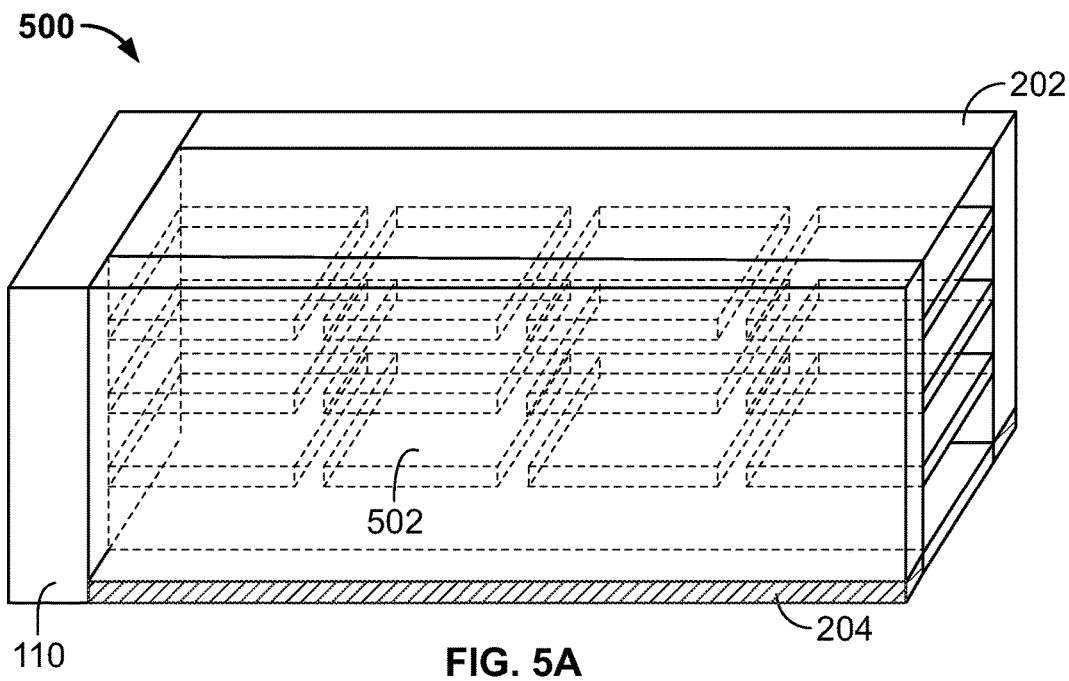
FIGS. 5A-5B illustrate schematic isometric and side views of another example battery module.
Figure 5B:
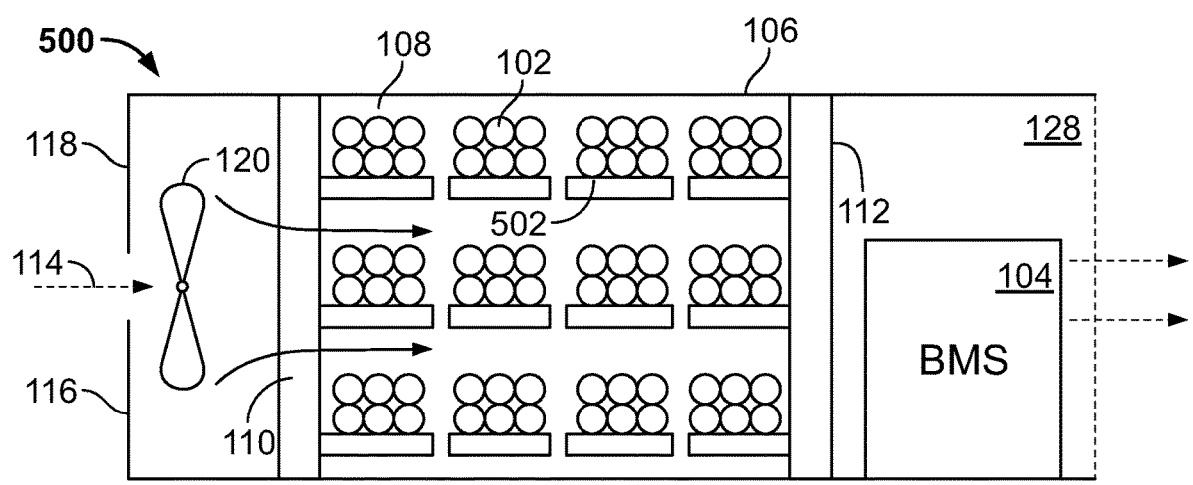

FIGS. 5A and 5B illustrate another example battery module 500, including a shelving system 502 for supporting the power cells 102. The shelving system 502 may include one or more adjustable shelves. The adjustable shelves of the shelving system 502 have a width shorter than the width of the inner volume 108, such that a plurality of adjustable shelves can be placed along the inner volume 108. In some implementations, the shelving system 502 can provide support for each individual power cell or for a small number of power cells. The configuration of the shelving system 502 enables air to flow around, over and under the sides of the power cells 102 arranged on a shelf of the shelving system 502. The shelving system 502 can significantly reduce heat transfer between power cells 102 to prevent event propagation.

Figure 6:
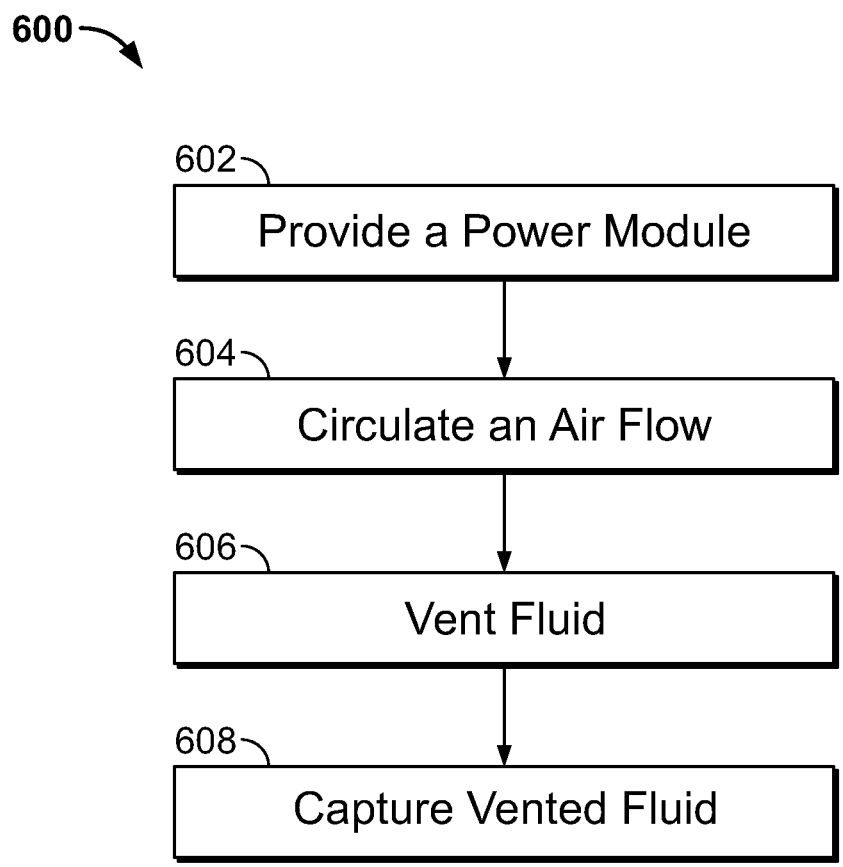
FIG. 6 illustrates a flow chart for a method of cooling a battery module.

FIG. 6 illustrates an example process 600 for cooling a data center based on an electrical power density. Process 600 can be implemented, for example, by or with a battery module, as described with reference to FIGS. 1A-5B. Process 600 can begin at step 602, when a battery module is provided. The battery module can include a housing that defines an inner volume, a plurality of power cells mounted in the inner volume of the housing and an air chamber enclosed in the housing. The housing can include an aperture formed in a first end member of the housing and an aperture formed in a second end member of the housing. Each of the power cells can include a vent member at an end of the power cell. The power cells can be directionally mounted in the inner volume such that the vent members face an offset direction relative to at least one of the aperture formed in the first end member or the aperture formed in the second end member of the housing.

In step 604, air flow is circulated. For example, air is circulated from an ambient workspace adjacent the battery module across a plurality of power cells. The circulating airflow can cool the power cells to maintain their temperature within an optimal range of operation, such as 20° C. to 25° C. In step 606, a fluid is vented from at least one vent member. The fluid is vented from a vent member in case a power cell failure. The vented fluid can be an electrolyte discharge. The vented fluid can be characterized by a temperature significantly higher than the average temperature within the battery module. In step 608, the vented fluid is at least partially captured in the air chamber that is fluidly decoupled from the airflow path. By capturing the vented fluid, the temperature, the pressure and possible chemical reactions are being controlled, increasing the operation safety of the battery module.

A number of examples have been described. Nevertheless, it will be understood that various modifications may be made. For example, the overall airflow can be right-to-left as well in a "pull cooling system" (compared with the drawings which are left-to-right airflow and a "push cooling system". A pull system is sometimes referred to as a "negative pressure cooling system" and a push system is sometimes referred to as a "positive pressure cooling system." Like any type of potential field effect, it is the gradient that directs the flow. While the described figures show certain packaging characteristics, other implementations can be contemplated by the disclosure. Other implementations can include different combinations of the features, or embodiments with one, some, or all of the disclosed packaging features. Accordingly, other examples are within the scope of the following claims.

What is claimed is:

1. A data center battery module, comprising:
a housing that defines an inner volume and comprises an airflow path that extends from an inlet formed in a first end member of the housing, through the inner volume, and to an outlet formed in a second end member of the housing;
a plurality of power cells mounted in the inner volume of the housing, each of the power cells comprising a body and a vent member at an end of the body of the power cell, the bodies of the plurality of power cells directionally mounted within the airflow path of the inner volume such that the vent members face an offset direction relative to at least one of the inlet formed in the first end member or the outlet formed in the second end member of the housing, each vent member configured to vent a liquid electrolyte contained within the respective power cell based on a power cell failure; and
an air chamber formed and enclosed in the housing and fluidly decoupled from the airflow path, the air chamber oriented parallel to the airflow path and defined between the first and second end members of the housing such that at least one of the vent members is positioned within the air chamber and in fluid communication with the air chamber to receive the liquid electrolyte vented from the respective power cell, the air chamber comprising an airflow inlet formed in the housing at a first location and an airflow outlet formed in the housing at a second location to fluidly couple the air chamber to an ambient environment.

2. The data center battery module of claim 1, wherein the air chamber comprises a first air chamber, the battery module further comprising a second air chamber formed and enclosed in the housing and fluidly decoupled from the airflow path and the first air chamber, the second air chamber oriented parallel to the airflow path and defined between the first and second end members of the housing such that at least one of the vent members is positioned within the air chamber and in fluid communication with the second air chamber to receive the liquid electrolyte vented from the respective power cell, the second air chamber comprising an airflow inlet formed in the housing at a third location and an airflow outlet formed in the housing at a fourth location to fluidly couple the second air chamber to the ambient environment.

3. The data center battery module of claim 2, wherein the first and second air chambers are positioned on opposed sides of the housing, and the first and second locations are on a first side of the housing adjacent the first air chamber, and the third and fourth locations are on a second side of the housing opposite the first side of the housing and adjacent the second air chamber.

4. The data center battery module of claim 1, wherein the airflow inlet of the air chamber and the airflow outlet of the air chamber are fluidly decoupled from the airflow path by one or more walls mounted in the inner volume, the air chamber defined at least in part by the one or more walls and the housing.

5. The data center battery module of claim 1, wherein the airflow path comprises a first airflow path, the battery module further comprising a second airflow path that extends from the aperture formed in the first end member, through the air chamber, and to the aperture formed in the second end member.

6. The data center battery module of claim 5, wherein the first and second airflow pathways are fluidly decoupled in at least a portion of the inner volume.

7. The data center battery module of claim 1, further comprising an air gap of between 2-3 mm between adjacent power cells.

8. The data center battery module of claim 1, further comprising a fluid absorbent material mounted in at least a portion of the inner volume.

9. The data center battery module of claim 8, wherein the fluid absorbent material is configured to absorb a liquid electrolyte discharged from one or more vent members.

10. The data center battery module of claim 8, wherein at least a portion of the fluid absorbent material is mounted in the air chamber.

11. The data center battery module of claim 1, further comprising:
   an electrical connection electrically coupled to the plurality of power cells and exposed to an exterior of the housing; and
   a power cell management system mounted in the housing.

12. The data center battery module of claim 1, wherein the plurality of power cells comprise a plurality of lithium-ion batteries.

13. The data center battery module of claim 12, wherein each of the lithium-ion batteries comprises a form factor 18650 lithium-ion battery.

14. The data center battery module of claim 1, wherein the offset direction is orthogonal relative to the airflow path.

15. The data center battery module of claim 1, further comprising a fan mounted in the aperture formed in the first end member.

16. The data center battery module of claim 1, further comprising an air gap between an inner surface of the housing and each of the plurality of power cells.

17. The data center battery module of claim 16, further comprising a thermal insulation material mounted in at least a portion of the air gap.

18. The data center battery module of claim 16, further comprising a frame mounted in the inner volume, the frame configured to support each of the plurality of power cells and define at least a portion of the air gap.

19. The data center battery module of claim 1, wherein each of the plurality of power cells comprises a substantially cylindrical shape defined by a diameter of a body of the power cell and a length of the body, and each of the power cells is mounted in the inner such that an axis that the length of each body is orthogonal to the airflow path.

20. The data center battery module of claim 1, further comprising a barrier that at least partially interrupts a fluid pathway that extends between the vent members and at least one of the aperture formed in the first end member or the aperture formed in the second end member of the housing.

21. The data center battery module of claim 20, wherein the barrier comprises a baffle mounted in the inner volume near one of the first or second end members of the housing, the baffle comprising one or more gaps through which the fluid pathway extends.

22. The data center battery module of claim 2, wherein the vent members of a first portion of the plurality of power cells are oriented in a first direction orthogonal to the airflow path, and the vent members of a second portion of the plurality of power cells are oriented in a second direction orthogonal to the airflow path and opposite of the first direction.

23. The data center battery module of claim 1, further comprising at least one directional pressure valve mounted at or near at least one of the airflow inlet or the airflow outlet of the air chamber.

24. The data center battery module of claim 23, wherein the at least one directional pressure valve is configured to open based on at least one of a predetermined pressure or a predetermined temperature of the air chamber.

25. The data center battery module of claim 4, wherein the at least one vent member positioned within the air chamber is on one side of the one or more walls, and the body of the power cell coupled to the at least one vent member is on another side of the one or more walls.

26. The data center battery module of claim 1, wherein the air chamber is decoupled from the airflow path by a wall extending from the first end member to the second end member, the air chamber positioned to receive the liquid electrolyte vented from the respective power cell, through the wall, into the air chamber.

27. The data center battery module of claim 26, wherein the air chamber comprises a second airflow path extending between the airflow inlet of the air chamber and the airflow outlet of the air chamber to fluidly couple the air chamber to the ambient environment.

* * * * *